Figure 3:
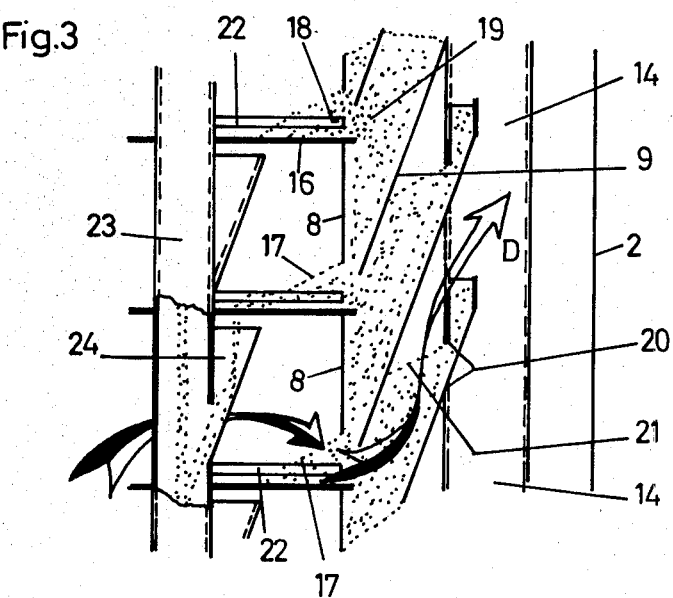

United States Patent [19]

Sgaslik

[11] 4,354,862
[45] Oct. 19, 1982

[54] FILTER FOR CLEANING GASES

[75] Inventor: Friedrich Sgaslik, Regensburg, Fed. Rep. of Germany

[73] Assignee: Andre Büechl Kalk-und Portandzementwerk, Regensburg, Fed. Rep. of Germany

[21] Appl. No.: 226,885

[22] Filed: Jan. 21, 1981

[30] Foreign Application Priority Data

Jan. 26, 1980 [DE] Fed. Rep. of Germany ........ 3002773

[51] Int. Cl.³ .............................................. B01D 46/04
[52] U.S. Cl. ........................................ 55/296; 55/96; 55/479; 55/99; 55/474
[58] Field of Search ............... 55/99, 96, 474, 479, 55/512, 296

[56] References Cited

U.S. PATENT DOCUMENTS

| 1,731,223 | 10/1929 | Brady | 55/474 |
| 2,493,356 | 1/1950 | Mercier et al. | 55/474 |
| 4,225,327 | 9/1980 | Sgaslik et al. | 55/474 |

Primary Examiner—Bernard Nozick
Attorney, Agent, or Firm—Eyre, Mann, Lucas & Just

[57] ABSTRACT

The invention relates to an apparatus for the treatment of substances in a stream of gas, especially for the absorption and/or adsorption or for the filtration of gases, having a first chamber, having a second chamber, and having a plurality of cells situated axially one over the other between the first and second chambers, these cells being separated from one another and from the first and second chamber by walls and having in one of the walls at least one upper inlet opening in the upper part and in another wall at least one lower outlet opening in the lower part for a medium moving downwardly through the cells and consisting of solid particles, fresh medium being fed to each cell through the upper inlet opening and the medium being carried out of each cell through the lower outlet opening by a sweeping means moving transversely relative to this cell or perpendicularly to the axial direction, and wherein a gas forming the gas stream enters the cells at least partially at the outlet apertures and flows through these cells in a direction opposite that of the flow of the medium.

The specialty of the invention consists in the fact that, with the exception of the bottommost cell, the lower portion of each cell, defined by its walls, reaches into the upper part of the cell thereunder and there communicates with the latter through an aperture.

17 Claims, 6 Drawing Figures

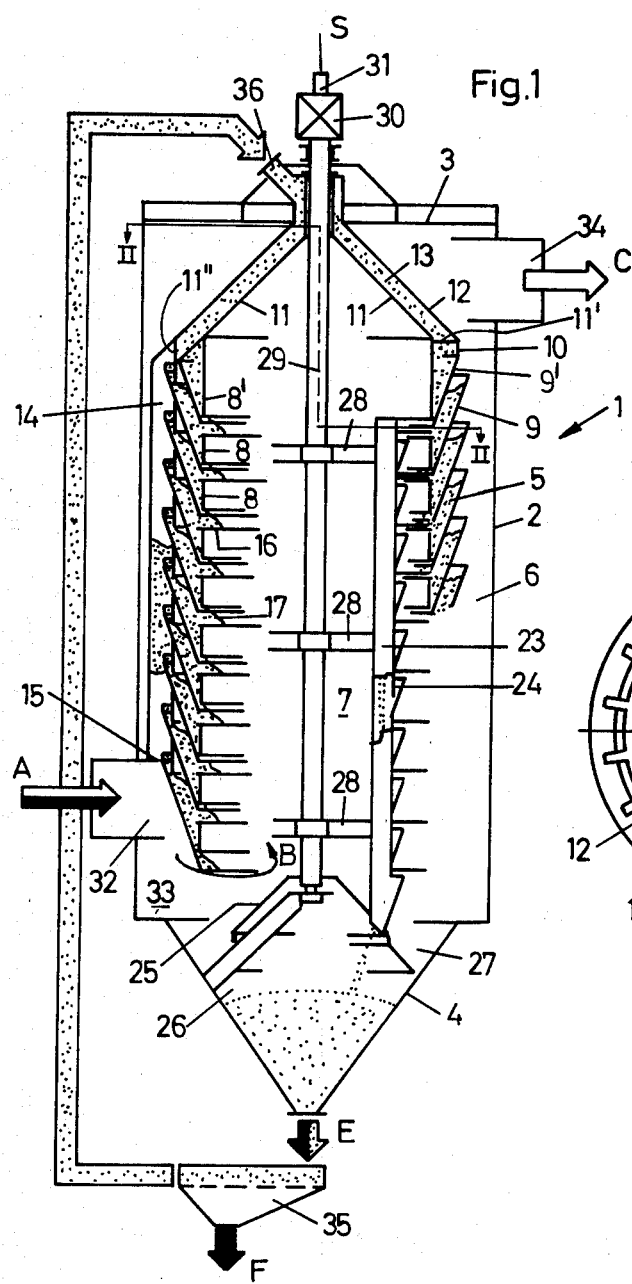
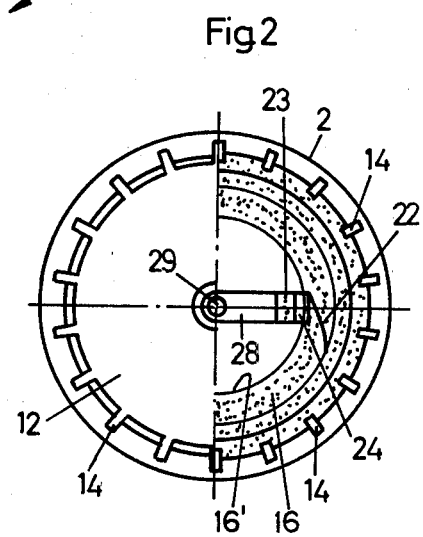

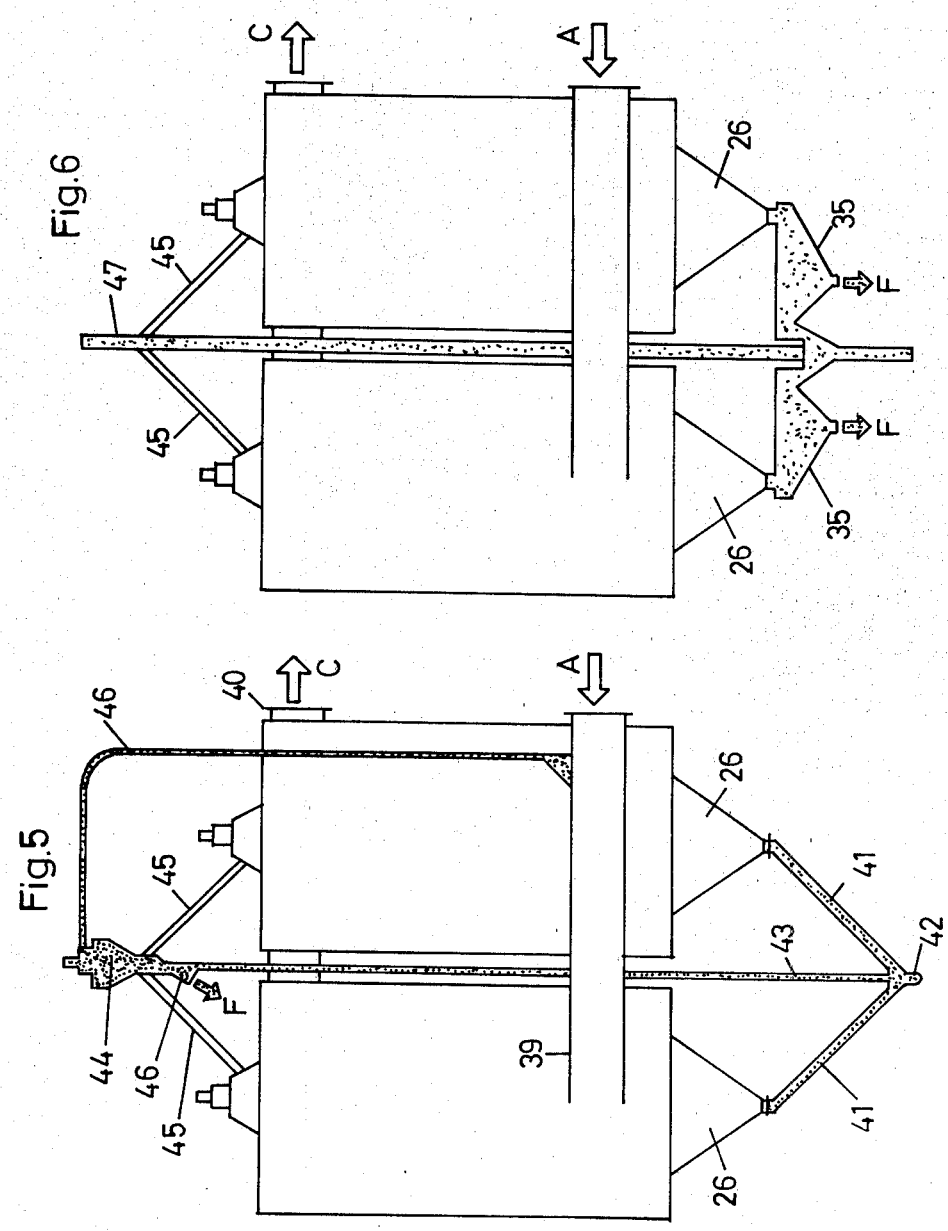

FILTER FOR CLEANING GASES

The invention relates to an apparatus for the treatment of substances in a stream of gas, especially for the absorption and/or adsorption or for the filtration of gases, having a first chamber, having a second chamber, and having a plurality of cells disposed axially one above the other and cells situated between the first and second chamber, these cells being separated from one another as well as from the first and second chamber by walls, and having each in one of the walls at least one upper inlet opening in the upper portion and in another wall at least one lower outlet opening in the lower portion for a medium consisting of solid particles and moving downwardly through the cells, fresh medium being fed to each cell at the upper inlet opening and the medium being carried out of each cell at the lower outlet opening by a sweeping means which can move relative to this space transversely or perpendicular to the axis, and a gas forming the gas stream entering the cells at least partially at the outlet openings and flowing through these cells in a direction opposite that of the flow of the medium.

Apparatus of this kind in the form of filters are known, and serve, for example, for cleaning dust from gas in the manufacture of lime and cement. Examples of suitable filter media in these filters are common filter gravel or coarser sizes of the material that is involved in the manufacturing process and from and to which the particles (dust particles) contained in the air to be cleaned and to be filtered therefrom are derived.

In the known filters, the individual, annular filter cells are all self-contained units, not only functionally but also in construction, i.e., the individual annular filter cells are situated one over the other in a spaced relationship, the annular gap between the filter cells being closed by additional separating walls so as to separate the outer and inner chamber also in the area between the individual filter cells or filter stages. Due to these additional separating walls alone, which have to be welded in an air-tight manner to the walls defining the filter cells, the known filters are comparatively complex and expensive in construction.

The spent filter medium is swept out, in the known countercurrent bulk layer filters, by means of scrapers which revolve about a common axis of the filter, one such scraper being associated with each filter cell or each outlet aperture. The scraper thus moves through a talus which forms at the bottom outlet aperture on the floor which is there provided. In the known filters, it is not possible to cover the entire cross section of a filter cell uniformly with the scraper, and this is to be attributed to the fact, on the one hand, that the filter cells of the known filter systems have at their bottom end a relatively large cross section, but on the other hand it is to be attributed to the fact that it is not possible in the known filter systems to have the scraper reach as far as possible into the particular filter cell. This is primarily due to the fact that in the known filter systems corners are necessarily formed in the lower part of the filter cells, in which filter medium saturated with dust particles can cake up and, under certain circumstances, form lumps or a hard coating on the filter cell wall, thereby interfering with the movement of the scrapers. This is especially true when the known filters are to be used for the removal of dust from gases in the manufacture of lime or cement.

In order to avoid the difficulties described above with regard to interference with the scrapers by deposits on the walls of the filter cells, the scrapers in the known filters have been constructed so as not to cover the entire cross section of the filter cells at their bottom end, but the result is that filter medium saturated with dust particles increasingly collects in the area of the filter cell that is not covered or insufficiently covered by the scraper, and this area then presents such a great resistance to the flow of the raw gas that the raw gas can barely move through it. This results in a considerable reduction of the effective filtering cross section of the filter cells and hence in a considerable reduction of the capacity of the filter system.

It is the object of the invention to devise an apparatus in which the number of wall elements required, and particularly the number of the junctions between the wall elements will be greatly reduced in comparison with known apparatus used as filters, and in which at the same time the individual cells or their cross section will be completely covered by the sweeping means by which the medium is swept out.

For the attainment of this object, an apparatus of the kind described above is constructed in accordance with the invention such that, with the exception of the lowermost cell, the bottom portion defined by the walls of each cell reaches into the upper portion of the cell beneath it and there communicates with the cell beneath it through a communicating aperture.

In the apparatus of the invention, therefore, in contrast to known countercurrent bulk layer filters, the individual cells are not fully separate units, but are nested one inside the other. Due to this nested construction of the cells, additional separating walls between the individual cells are unnecessary in the apparatus of the invention. Furthermore, the junctions between such additional walls and the walls forming the cells are, of course, also eliminated. This fact alone results in a substantial simplification of design. Due to the nesting of the cells it is furthermore unnecessary to make the junctions between wall elements airtight wherever they are in the vicinity of the cells, because these junctions are always surrounded by the medium, which prevents any direct gas flow between the first and the second chamber, even if the junctions (welds, for example) are not made in an airtight or gas-tight manner.

Furthermore, the nesting of the cells makes the overall height of the apparatus extremely low.

In the case of the invention, it is also possible to construct the sweeping means or the scrapers serving as sweeping means of such a length that these scrapers actually cover the entire cross section of the cells in their lower portion, so that any lumps present or forming in the medium will be knocked by the scrapers through the communicating aperture and down into the cell below if such lumps cannot be cleared through by the scrapers. On account of the passage aperture adjacent the floor of the cells there are no corners or dead spaces in which medium heavily charged with dust particles, for example, might become lodged and form a coating that interferes with the scrapers.

The apparatus of the invention, in which the chambers are preferably of annual construction and are disposed concentrically with a common axis, and in which the sweeping means revolve about the common axis, is suitable, for example, as a filter system for the removal of dust particles and the like from a stream of gas. The apparatus of the invention can also, however, be used for adsorption and/or absorption, for the purpose, for example, of removing or "filtering" from the gas stream gas particles, such as fluorine, for example. Of course, the apparatus of the invention can also be used as a reactor for the purpose of producing a chemical reaction between the medium and the gas stream or substances present in the gas stream. It is furthermore possible to use the apparatus of the invention for the drying of a medium, for example. These and other applications are designated generally by the term, "treatment of substances in a stream of gas." The term "used" and/or "treated" medium, as used in the present description, is intended to refer to the medium which leaves the cells, i.e., which is charged with dust particles when the apparatus of the invention is used as a filter.

Since in the apparatus of the invention the cells can be covered uniformly by the sweeping means over their entire cross section or over the entire cross section which is effective for the removal of the treated medium, when the apparatus of the invention is used as a filter, for example, the result will be also a uniform saturation of the medium (filter medium) with dust particles in the horizontal direction and hence an optimum utilization of the cells for the filtration. Due to the uniform saturation of the medium with dust particles horizontally, the concentration of the gas flow within a particular cross-sectional area in the cells is simultaneously prevented. Such a concentration of the gas stream can have the result, especially if relatively large amounts of raw gas are involved, that passages will form in the medium, through which the raw gas can flow, and the medium will be unable to retain the dust particles contained in the gas. Similar advantages are achieved also in other applications of the apparatus of the invention.

In a preferred embodiment of the invention, the cells are constructed such that they taper towards their bottom end. This results in an especially simple design. Furthermore, this design has the advantage that the cells have a very small cross section at their bottom, which can be fully covered by the sweeping means with a relatively slight depth of penetration or reach.

The invention will be further explained below with reference to the drawings representing embodiments, in conjunction with the use of the apparatus as a filter for the removal of dust. These embodiments of the apparatus of the invention can also be used for other purposes, i.e., they can be used quite generally for the treatment of substances in a stream of gas.

Figure 4:
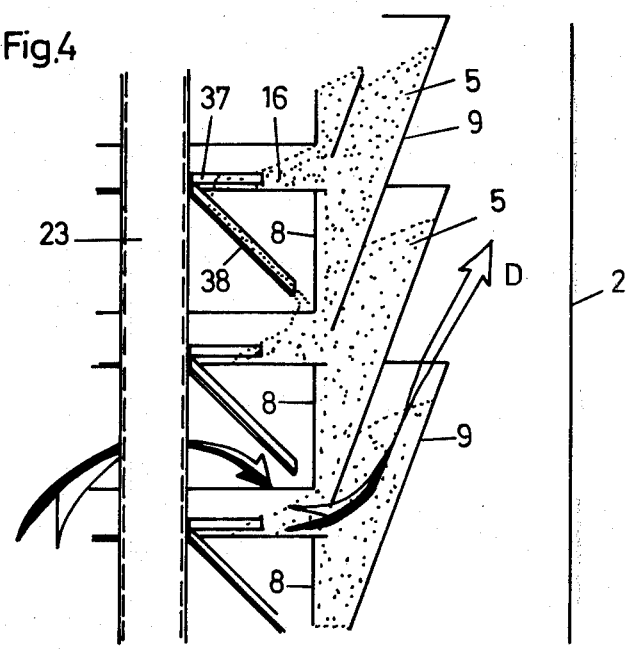

FIG. 1 is a longitudinal cross section through a filter in accordance with the invention, FIG. 2 is a transverse cross section through the filter of FIG. 1, FIG. 3 represents a detail of three superimposed filter cells together with the corresponding sweeping means for carrying away the spent filter medium, FIG. 4 is a representation similar to FIG. 3, but relates to a modified embodiment, FIG. 5 is a diagrammatic side elevational view of a filter system composed of two filters of FIG. 1, and FIG. 6 is a representation similar to FIG. 5, but relates to a modified embodiment.

The filter represented in FIG. 1 consists of a casing 1 having a cylindrical outer wall 2, the casing 1 being held by means of supporting elements, not shown, such that the cylinder axis or axis of symmetry of the casing 1 is disposed vertically. The casing is closed at the top by a cover plate 3 and has at its bottom end a section 4 which tapers downwardly in the manner of a funnel or cone.

In the interior of the casing 1 a plurality of annular filter cells 5 (ring trays), each tapering downwardly, are disposed one over the other, concentrically with the axis of symmetry S, such that these filter cells 5 taken as a whole divide the interior of the casing 1 into two chambers, namely an outer annular chamber 6 externally defined by the outside wall 2 and internally by the vertically stacked annular filter cells 5, and an inner, substantially cylindrical chamber 7 defined externally by the stacked filter cells 5. Each filter cell 5 is separated from the inner chamber 7 by an inner annular wall 8 and 8', and is separated from the outside and from the outer chamber 6 by a wall 9 and 9'. The walls 9 and 9' are formed by rings which flare conically upward, i.e., the diameter of the rings formed by the walls 9 and 9' is greater at the top of each filter cell 5 than at the bottom thereof, so that the filter cells taper, in the manner described, toward their lower end. As shown furthermore in FIG. 1, the inner wall 8' of the top filter cell 5 has a greater height than the corresponding walls of the filter cells beneath it, while the outer wall 9' of the top filter cell 5 is lower in height than the corresponding walls 9 of the filter cells beneath it, and merges at its top with a cylindrical or annular section 10. The walls 8, 8', 9 and 9' as well as the section 10 are all concentric with the axis of symmetry S.

To separate the chambers 6 from one another 7 also in the upper as well as in the lower part of the filter, wall sections 11 and 12 are provided in the upper part of the filter, which are concentric with one another and concentric with the axis of symmetry S and taper conically upward, and which are spaced apart from one another to form between them a passage 13 for the feeding of fresh filter medium as will be described in detail further below. The inner wall section 11 is welded to the upper margin of the walls 8' and 9' of the uppermost filter cell and its bottom end extends beyond the uppermost filter cell, as represented in FIG. 1 left of the axis of symmetry. To provide a communication between the passage 13 and the uppermost filter cell 5, the wall section 11 has a plurality of openings distributed about the axis of symmetry S in the area between the walls 8' and 9'. Such an opening 11' is represented in FIG. 1 on the right side of the axis of symmetry S. The wall section 12 is welded at its bottom end to the upper margin of the wall section 10, a plurality of openings 11" distributed about the axis of symmetry S being provided in the wall section 10, which communicate passage 13 with a plurality of vertical tubes 14 for the distribution of the filter medium, as represented in FIG. 1 on the left of the axis of symmetry S. Corresponding to the openings in the wall section 10 the distribution tubes 14, which are situated outside of the filter cells 5 in chamber 6, are distributed evenly about the circumference of the filter cells and about the axis of symmetry S, as is represented in FIG. 2. FIG. 2 shows a cross section through the filter of FIG. 1 in two planes, the left half of FIG. 2 representing a cross section in a plane in the area of the cover plate 3, and the right half of FIG. 2 representing a section through the filter of FIG. 1 in a plane lying adjacent the bottom end of a filter cell 5.

In the lower part of the filter, the chambers 6 and 7 are separated from one another by a horizontal annular wall 15 which is welded at its outer margin to the inside surface of the outer wall 2 and at its inner margin to the wall 9 of the bottom filter cell 5, and specifically to the upper portion of the wall 9. The wall 15 forms simultaneously the bottom closure of all of the distribution passages 14.

Each filter cell 5 furthermore has a tray 16 formed by a horizontal ring which extends into the inner chamber 7 and there forms a floor for a talus 17 of the filter medium, as will be described in detail further below. Above the tray 16 or above the floor formed by this tray, each filter cell 5, with the exception of the bottom one, has two annular apertures 18 and 19 concentric with the axis of symmetry S, of which aperture 18 is the bottom outlet aperture for the used filter medium and aperture 19 the communicating aperture through which two consecutive filter cells communicate with one another. At the bottom filter cell 5, the tray 16 formed by the horizontal ring is welded at its outer margin directly to the bottom edge of the outer wall 9, whereas in the filter cells above it, the trays 16 formed by the horizontal rings are welded each to the upper edge of the vertically spaced and stacked annular walls 8 such that the trays 16 project partially into the filter cells 5, but to a greater extent project into the inner chamber 7 to form the above-mentioned floors for the talus 17. The bottom filter cell 5 has only the annular aperture 18 which is the bottom outlet opening for the used filter medium. Each aperture 18 is formed between the lower edge of the wall 8 or 8' and the upper surface of tray 16 and each aperture 19 is formed between the lower edge of the wall 9 or 9' and the upper surface of tray 16.

As furthermore shown in FIG. 1, the individual filter cells 5 are nested one in the other such that the bottom portion defined by the walls 8' and 9' and 8 and 9 extends into the upper portion of the filter cell below it, i.e., each filter cell 5, with the exception of the bottom one, is surrounded in its lower portion by the upper portion of the filter cell below it, this being achieved by designing the walls 9 and 9' as rings reaching one into the other, each tapering conically toward the bottom and being concentric with the axis of symmetry S.

As shown especially in FIG. 3, the bottom margin of each wall 9—and this applies also to the wall 9' of the top filter cell 5—is lower in each case than the bottom margin of the adjacent wall 8 and 8', so that the annular apertures 19 have a lesser height than the annular apertures 18. Furthermore, the configuration of the walls 9 and 9' is selected such that the bottom edge of these walls is situated in each case just above the outer margin of the ring forming the tray 16 of the particular filter chamber 5.

As indicated furthermore in FIG. 3, the upper portions of the walls 9—and this applies also to the wall 9 of the bottom filter cell—reach into the distribution tubes 14 distributed about the filter cells, each of these distribution tubes having at this point an opening 20. The openings 20 form upper inlet openings through which the filter cells disposed underneath the top filter cell 5 are supplied through distribution tubes 14 with fresh filter medium. Setting out from the upper margin of the openings 20, the filter medium forms in each filter cell 5 the upper talus fan 21 extending radially inwardly and sloping downwardly toward the interior of the filter until it meets the wall 9 of the filter cell 5 above it.

For the removal of the used filter medium, at least one sweeping means is associated with each filter cell 5 and is formed in the case of the illustrated embodiment by a scraper 22. The scrapers 22, each of which is situated above the tray 16 of the particular filter or above the floor surface formed by this tray and extends into the lower talus fan 17, are fastened to a common collecting tube 23 for the removal of the used filter medium. Under each scraper 22 and under the floor formed by the tray 16 of each filter cell 5 there is furthermore provided a pocket 24 which is open at the top and empties into the collecting tube 23, and which catches the used filter medium taken by the corresponding scraper 22 from the talus fan 17, and delivers it across the inner edge of 16' of the tray 16 into the collecting tube 23. The collecting tube 23, which is closed at its upper end, extends at its lower end through a conical wall 25 and opens into a chamber 26 for the gathering and removal of the used filter medium, which (chamber 26) is separated from the inner chamber 7 by the above-mentioned conical wall 25 and a wall 27 prolonging the wall 25 and joined at its outer margin to the inside surface of the wall section 4.

The collecting tube 23 is fastened by a plurality of arms 27 to a shaft 29 which extends along the axis of symmetry S and is mounted for rotation at its bottom and at its top end about the axis of symmetry S. The shaft 29 is driven by a drive means, such as a hydraulic motor 31, through a planetary drive 30 at the top of the filter, and this causes the scrapers 22 to move along the floor surfaces formed by the bottoms 16, thereby feeding used filter medium from the talus 17 through the trap pockets 24 into the collecting tube 23. Like the collecting tube 23 bearing the scrapers and the pockets 24, the conical wall 25 is affixed to the shaft 29 and rotates with this shaft while the wall 27 remains stationary.

The operation of the filter can be described as follows:

The gas that is to be cleaned is fed to the filter as indicated by the arrow A through a connection 32 which leads into a chamber 33 in the interior of the casing 1, chamber 33 being closed off from the outer chamber 6 by the annular wall 15, but communicating with the inner chamber 7 all around the bottom filter cell, as indicated by the arrow B. The chamber 33 forms a preliminary separator for the dust particles contained in the gas being cleaned (raw gas). The dust particles separated in chamber 33 flow, for example, through apertures which are provided on the outer margin of the wall 27 into the chamber 26, and from there they are discharged together with the used filter medium, as will be described further below.

After this preliminary separation of dust particles, especially the coarser dust particles contained in the raw gas, the raw gas flows into the inner chamber as indicated by the arrow B. The actual cleaning effect is achieved by the fact that the raw gas enters into the individual, nested filter cells 5 in the area of the talus 17 and then moves into the filter cells 5 through the filter medium contained therein and consisting of solid particles such as gravel, crushed stone and the like. Dust particles contained in the raw gas are thus deposited on the filter medium and retained thereby, while the clean gas then leaves the filter cells through the talus 21 and moves on through the distribution tubes 14 into the outer chamber 6 where it is collected and from which it is removed as indicated by the arrow C through a connection 34 at the top of the filter.

In FIG. 3 the flow of the gas through the individual filter cells is indicated by the arrow D. It can be seen from this figure that the raw gas flows substantially upwardly through the filter cells 5. It can also be seen from FIG. 3 that, due to the nesting of the filter cells 5, the greatest part of the raw gas does not flow through the entire height of the individual filter cells, but through only a portion of the height of the filter cell, i.e., the gas to be filtered enters the filter cells at the talus 17 provided at the bottom end of the filter cells, but leaves the filter cells through the upper talus 21 of the next filter chamber down.

Since the optimum desirable filter effect can be achieved only if the saturation of the filter medium with dust particles diminishes towards the talus 21 and the filter medium in the area of this talus 21 contains no dust particles or only very small amounts of dust particles, the scrapers 22 which move through the talus 17 when the shaft 29 rotates will continuously or at certain intervals discharge used filter medium at the bottom end of each filter cell, so that unused filter medium can pour into the individual filter cells through passage 13 and through the distribution tubes 14, and unused filter medium will always be present in the area of the upper talus 21.

The filter medium flows downwardly through the filter cells 5, i.e., in a direction opposite that of the flow of the raw gas through the filter cells. This is very important to the achievement of an optimum cleaning action, because on the one hand it assures that the saturation of the filter medium with dust particles will diminish towards the upper talus 21, and on the other hand dust particles deposited in the filter medium are moved down from the talus 21 toward the lower end of the filter cells 5 by the entering fresh filter medium.

It can furthermore be seen that the filter medium flows through the entire height of the individual filter cells 5, i.e., the filter medium which enters at the upper inlet opening, e.g., opening 20 of a filter cell, will leave this filter cell only at the lower outlet aperture 18. In the embodiment represented, with the "nested" arrangement of the filter cells 5 which has been chosen in this embodiment, the path which is traveled by the filter medium through the filter chambers 5 is approximately twice as long as the path of the raw gas through the individual filter cells.

Due to the special arrangement of the walls 9 and 9', and especially due to the special position of the bottom edges of these walls with respect to the edges of the trays 16 extending into the filter cells, the additional assurance is provided that the filter medium which reaches the bottom end of a filter cell and forms the talus fan 17 will be virtually completely acted upon by the scraper 21 and will be carried by the latter over the pockets 24 into the collecting tube 23, that is to say, the design that has been chosen virtually excludes the possibility that used filter medium will pass through the communicating aperture 19 into the filter cell below it.

Owing to the fact that each filter cell is greatly constricted in its bottom portion defined by the walls 8 and 9 and 8' and 9', the cross section for the sweeping and removal of the used filter medium by the scrapers 22 is very small, i.e., the scrapers 22 can fully engage the used filter medium at the bottom end of the filter cells 5, and there is no danger that used filter medium heavily saturated with dust particles will settle in dead spaces.

Since the aperture 18 serving for the removal of the used filter medium is directly adjacent the communicating aperture 19, there are no corners in the area where the used filter medium is removed, in which filter medium charged with dust particles might easily collect and cake up due to moisture. If dust-charged filter medium cakes up due to moisture in the filter of the invention, and if the caked material cannot be cleared through by a scraper 22, it will be pushed by this scraper through the communicating aperture 19 into the next filter cell, and this action will be repeated in the successive filter cells until the lumps reach the lowermost filter cell and there they will be positively forced out by the scraper. Both due to the avoidance of corners in the area where the filter cells are swept, and due to the possibility of pushing cakes filter medium through the communicating aperture 19 into the next filter chamber, the danger of damage to the scrapers is greatly reduced.

The nesting of the filter cells 5 and the resultant manner in which the raw gas and the filter medium flow produce an effect which can also be called a "trap effect", and which contributes very importantly toward improving the filtering action. If used filter medium is removed by the scrapers 22 from the talus 17, additional filter medium will flow in the same amount from the bottom of each filter cell, from the annular gap formed by the bottom edges of walls 8, 9, 8' and 9', so that the talus 17 will be restored to its original shape after the scraper 22 passes by. After a certain time delay, more filter medium will pour down to the upper talus 21. As a result of this positively caused time delay, the filter medium will have come to rest again in the area of the talus 17 when the additional filter medium in the upper part of the filter cell 5 flows in. With reference to the flow of the raw gas through the filter cell, this means that the raw gas will always find a certain amount of filter medium at rest ahead of it. For this reason it is not possible for any dust particles contained in the raw gas to pass through the filter medium when it is "loosened up" in the afterflow. This trap effect is due to the fact that the raw gas enters the filter medium at the talus 17 at the bottom end of a filter cell, and leaves this filter medium through the upper talus 21 of the next filter cell down, as indicated in FIG. 3.

Another advantage of the filter represented is that the upper talus 21 have a relatively small radial length, so that the finer particles of the filter medium fed in through the upper inlet openings cannot separate from the coarser ones. The danger of such separation exists whenever the filter medium consists of particles of different size, which as a rule is the case. If the talus 21 were to be made to have a greater radial length, the larger filter medium particles would concentrate in the area of the filter cell closer to the axis of symmetry S and the finer particles would concentrate in the portion of the filter cell farther away from the symmetry axis S. This would create the danger that pathways would be formed in the portion of filter cells 5 closer to the symmetry axis S, and that the raw gas would pass through them and out of the filter cells without being sufficiently filtered. On account of the nesting of the filter cells 5, the radial length of the talus 21 can be kept to an optimum small size by appropriately choosing the size of the filter cells and especially by selecting a size that will assure the flow of the filter medium even when moisture is present.

The nesting of the filter cells 5 provides the additional advantage of a filter of low structural height. And lastly it permits a very simple construction, since the individual walls 8, 9, 8' and 9' separating the individual filter cells 5 from one another and from the outer and inner chambers 6 and 7, respectively, are formed of simple rings, and furthermore it is not essential that any welds within the filter cells 5 be air-tight.

The use of the pockets 24 in conjunction with the sweeping means, i.e., in conjunction with the scrapers 22, has the advantage that used filter medium passes from each filter cell directly into the collecting tube 23, so that the formation of dust due to the dropping of filter medium charged with dust particles onto the floor of the inner chamber 7 and onto the floor of chamber 33 will be prevented. Such formation of dust would charge the raw gas additionally with dust particles and would thus impair the filtering action.

The used filter medium fed to the chamber 26 is from time to time taken from this chamber as indicated by the arrow E, and is fed to a dust separator 35, in the form of a shaker sieve for example, in which the dust particles are separated from the filter medium. The dust particles are then carried away as indicated by the arrow F, while the cleaned filter medium is then fed back to the top of the filter through the connection 36 leading into passage 13.

It has been found that an additional depositing of dust onto the talus 17 being constantly reformed by the incoming filter medium permits the achievement of a still better filtering and dust removing action. This is to be attributed to the fact that the filter medium (the gravel, for example) acts as a sieve in which dust particles are retained, which then in turn act as a filter medium or provide for very fine interstices in the filter medium, through which the raw gas has to pass. This improved dust removal effect by an additional deposit of dust is, of course, assured only when the depth of penetration of the dust particles into the filter medium is kept as slight as possible, which in the case of the filter system of the invention is assured by the feeding of always fresh filter medium.

In order to achieve a still further improved filtration effect by the additional depositing of dust on the talus 17, it is possible in the case of the filter represented in FIG. 4 to provide, in addition to the scrapers 22, scrapers 37 which are also fastened to the collecting tube 23 and rotate with the shaft 29, one such additional scraper 37 being associated with each tray 16, and made to lag behind the scraper 22 as shaft 29 rotates in a particular direction. This scraper 37 takes a certain portion of the filter medium heavily loaded with dust particles from the corresponding talus 17, and drops it through a narrow chute 38 onto the talus 17 below it. In this manner an autogenous filtering layer of high dust retaining power is produced on the talus, in which the depth of penetration of the dust into the filter medium is low.

FIGS. 5 and 6 present diagrammatic elevational views of two filter systems each containing two filters in accordance with FIGS. 1 to 4. The raw gas is fed to the filter systems as indicated by the arrow A through a pipe 39 which is connected to the inlet connections 32 of the filters. The cleaned gas is taken from the filter systems as indicated by the arrow C through a pipe 40 which is connected to the connections 34 of the filters.

In the embodiment represented in FIG. 5, the filter medium charged with dust particles comes from the chambers 26 of the two filters through pipe 41 to a common point 42 below the filter system, and from there it is delivered by compressed air or gas through the vertical tubes 43 to a gas or air separator 44 which is disposed above the filters and in which the dust particles are separated from the filter medium. The filter medium freed of dust particles then passes through the tubes 45 to the inlet connections 36 of the filters and from there into the passage 13, while the dust leaves the gas or air separator at 46, as indicated by the arrow F. The air or gas used for the feeding of the filter medium is injected through pipe 46 into pipe 39.

In the case of the embodiment represented in FIG. 6, the used filter medium or filter medium charged with dust particles passes from the chambers 26 into mechanical dust separators 35 from which the dust is removed at the bottom as indicated by the arrows F. The filter medium freed of the dust particles is fed by a mechanical vertical conveyor 47, e.g., by a bucket conveyor, to the pipes 46 and thus back into the passages 13 of the filters.

The invention has been described above in conjunction with embodiments. It is to be understood that modifications and changes can be made without thereby departing from the concept underlying the invention.

What is claimed is:

1. Apparatus for the treatment of substances in a gas stream comprising:
    (a) a casing;
    (b) a plurality of annular cells concentrically arranged with respect to a common vertical axis one above the other in said casing, a bottom portion of each cell, except the lowermost, extending into the cell situated thereunder;
    (c) an inner gas chamber formed by an area of the interior of the casing, which area is surrounded by said plurality of annular cells, and an outer gas chamber formed by an area of the interior of the casing, which area surrounds said plurality of cells, said inner chamber having gas inlet means and said outer chamber having a gas outlet means;
    (d) a medium inlet means disposed at the top of said casing and channel means for channeling medium to each said cell from said medium inlet;
    (e) each said annular cell comprising:
        (i) inner and outer annular wall means;
        (ii) said inner annular wall means and said outer annular wall means of each cell separating each cell from said inner and outer gas chambers respectively;
        (iii) an opening in the bottom portion for communication with the annular cell situated thereunder;
        (iv) a cell medium inlet means for receiving medium from said channel means;
        (v) an annular opening at a lower part of said inner wall means defining a gas inlet and medium outlet from each cell;
        (vi) said cell having an upper gas outlet at an upper portion thereof for outlet of gas therefrom;
        (vii) a substantially horizontally disposed ring wall means having an inner edge and being disposed adjacent and below said annular opening and extending into the interior of said inner gas chamber, an upper surface of said substantially horizontally disposed ring wall means being adapted to support thereon a talus of medium discharged from said cell through said annular opening; and
        (viii) the annular opening of each cell, except for the lowermost cell, being situated below the upper gas outlet of the cell situated thereunder;
    (f) a plurality of sweeping means in said inner gas chamber, said sweeping means being mounted for rotation about a common vertical axis, at least one of said sweeping means being located at each annular opening and disposed above said upper surface; and (g) a plurality of collection pockets in said inner gas chamber, said pockets being mounted for rotation about said common vertical axis, each of said pockets being located below one of said sweeping means and below one of said horizontally disposed ring wall means, said sweeping means being operable when rotated, to move across said upper surface of said horizontally disposed ring well means and is operative for sweeping medium deposited on said horizontally disposed ring wall means across an inner edge of the ring wall means into said pockets.

2. Apparatus as claimed in claim 1, wherein at least one of said receiving openings is located below each said horizontally disposed wall means.

3. Apparatus as claimed in claim 1, wherein the inner wall means separating the inner gas chamber from the treatment chambers are constructed as rings, each said ring having substantially the same diameter as the others.

4. Apparatus as claimed in claim 1, wherein said channel means for establishing communication between the medium inlet to the apparatus and each said medium inlet means on the cells comprise a plurality of distribution tubes distributed around the said cells and disposed parallel to the common vertical axis, said distribution tubes having openings through which extend surfaces formed by portions of said outer annular wall means.

5. Apparatus as claimed in claim 1, wherein the bottom portions of cells taper downwards.

6. Apparatus as claimed in claim 1, wherein said annular cells are nested one inside the other such that in the area of the outer gas chamber with the exception of the lowermost cell, the lower part of each said cell is surrounded by the upper part of the cell above it.

7. Apparatus as claimed in claim 1, wherein with the exception of the lowermost of said annular cells, each annular cell extends for about half of its vertical dimension into an annular cell situated beneath it.

8. Apparatus as claimed in claim 1, wherein the opening providing communication between a cell and the cell situated thereunder is disposed at a point lower than the top limit of the corresponding annular opening.

9. Apparatus as claimed in claim 1, wherein the sweeping means comprise a plurality of scrapers of which at least one scraper is associated with each cell, respectively, all said scrapers being fastened to a shaft revolving about said common vertical axis and further comprising a collection tube fastened to said shaft, said collection tube having receiving openings for receiving the medium swept out by the scrapers into the collecting tube.

10. Apparatus as claimed in claim 1, wherein each said horizontally disposed wall means is adjoined by bottom wall means disposed transversally of the vertical axis, and wherein said opening providing communication between a cell and the cell situated thereunder is disposed on the side of the bottom wall means that is remote from said horizontally disposed wall means.

11. Apparatus as claimed in claim 10, wherein the outer annular wall means separating the annular cells from the outer gas chamber are formed as conical ring walls having a bottom edge, said bottom edge of each conical ring wall being situated above the associated bottom wall means of each cell, each said bottom edge and the associated bottom wall means forming top and bottom limits respectively, of each said opening for obtaining communication between each cell and the cell situated below.

12. Apparatus as claimed in claim 10, wherein each said inner wall means separating the cells from the inner gas chamber comprises a cylindrical ring wall having a bottom edge, each cylindrical ring wall being disposed above said bottom wall means so that each bottom edge and the associated bottom wall means form the top and bottom limits, respectively, of said annular opening forming a spent medium outlet.

13. Apparatus as claimed in claim 1, further comprising means for transferring a portion of medium deposited at the annular opening defining the spent medium outlet of a cell onto a deposit of the medium at the annular opening of a lower cell.

14. Apparatus as claimed in claim 13, wherein said means for transferring a portion of medium comprises a plurality of sloping chutes and a plurality of additional sweeping means which are fastened to a shaft revolving about the common axis, at least one such additional sweeping means being associated with each cell and corresponding sloping chute, whereby said portion of medium may be swept over each sloping chute onto the medium deposited in the cell situated therebelow.

15. Apparatus as claimed in claims 13 or 14, wherein the means for transferring a portion of medium from the deposit lag behind the sweeping means with respect to the direction of movement of these sweeping means.

16. Apparatus as claimed in claim 1, wherein each said outer annular wall means separating the cell from the outer gas chamber are formed as a conical ring-shaped wall.

17. Apparatus as claimed in claim 16, wherein the conical ring-shaped walls forming said outer annular wall means of all said annular cells are disposed in parallel to one another.

* * * * *